United States Patent Office 2,769,540
Patented Nov. 6, 1956

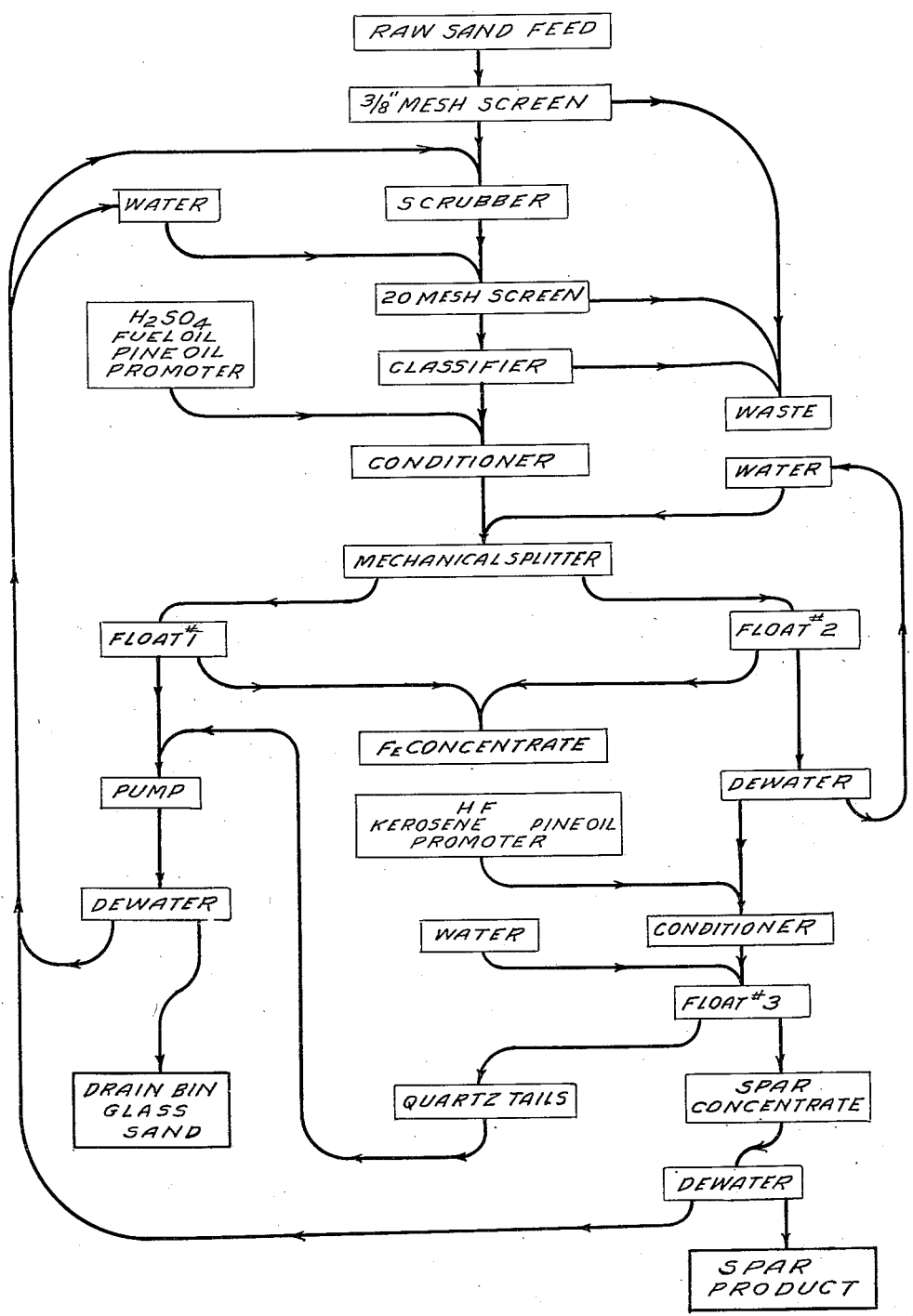

2,769,540

METHOD OF BENEFICIATING SAND

Otto R. Brown, Sacramento, Calif., assignor to American Cyanamid Company, New York, N. Y., a corporation of Maine Application November 3, 1952, Serial No. 319,510

4 Claims. (Cl. 209—166)

The present invention relates to an improved process for purifying industrial sands and particularly, glass sands, by froth flotation.

Such sands generally contain ferruginous impurities in the form of iron-bearing and iron-stain minerals which are detrimental in glass making. Although such ferruginous impurities exist in the sands in a very small quantity, it is essential that they be reduced to very low limits.

There are large natural deposits of sand in the United States which have a high alumina content, and it is an advantage of my process that the alumina content of the purified glass sand may be regulated to any desired amount. The alumina constituent of industrial sand is generally present as feldspar, and the proportion of feldspar to quartz will vary widely depending upon the origin, location, and age of the deposit. A representative deposit amenable to the process of the present invention might analyze as much as 53% feldspar and 45% quartz. An assay of this product would show about 0.15% $Fe_2O_3$ and 11.4% $Al_2O_3$. The feldspar constituent would assay 21.5% $Al_2O_3$ and 0.1% $Fe_2O_3$.

During World War II and the years immediately thereafter, the glass manufacturers were able to sell glass containers, regardless of color and other defects, simply due to demand caused by tin and steel shortages during the war; that is, tin and steel shortages made it possible to sell any glass container that did not fall apart, regardless of its color. This had created a demand for high-aluminous sand because of its low cost and availability; however, the high alumina content and relatively high iron content was a disadvantage for the average glass manufacturer. The low cost of this raw material was outweighed by the difficulties incident to handling in the plant and by defective and poorly-colored containers.

With postwar competition, the glass manufacturers began to reduce the alumina content of the glass mix to around 3.5% $Al_2O_3$ which made it necessary for them to use a large percent of high-silica, alumina-free sand. The present invention is the result of my discovery that by means of a two-step flotation process, ferruginous impurities can be removed from raw sand deposits and the tailing from the iron float converted into a tailor-made product by removing any undesired feldspar in a second flotation step. Some feldspar may be desired in glass sands, since the sodium, potassium or calcium content of the feldspar replaces the more expensive soda ash and lime in the glass mix.

My process is very flexible in that it may be used to produce a quartz concentrate, a feldspar concentrate, or any mixture of the two. By this invention, it is economically possible not only to obtain recoveries in the form of finished tailor-made concentrates considerably exceeding the recoveries obtained by prior methods of flotation, but the finished concentrates are of improved grade because of more thorough separation of the impurities in the raw sand.

My invention can best be explained by an example of a pilot plant operation on a scale comparable to a commercial operation. The raw sand in this example is supplied at an average rate of about 50 tons per hour. Referring to the drawing, the feed is first sized on a ⅜" screen with the oversize going to waste. The screened sand is scrubbed violently at about 80% solids and the discharge from the scrubber is diluted to 20% solids with water which may contain hydrofluoric acid. The diluted scrubbed sand is passed over a 20-mesh screen and the undersize material is deslimed, and dewatered in a screw classifier to approximately 75% solids. The effluent water and slimes from the classifier, as well as the oversize from the 20-mesh screen are sent to waste.

The sized and scrubbed sand is conditioned at high solids with about 0.45 lb./ton sulfuric acid, 0.40 lb./ton fuel oil, 0.55 lb./ton of a water-soluble petroleum sulfonate, 0.45 lb./ton of an oil-soluble petroleum sulfonate, and about 0.01 lb./ton of pine oil. The pH of the conditioned sand is approximately 2.5, depending on the alkaline material present in the feed. The conditioned sand is diluted with water to about 25% solids and separated mechanically into at least two parts. This mechanical separation may be made either before or after the iron flotation step. The iron concentration may now readily be floated off in separate flotation cells and the iron-float tailings recovered in better than 95% yield. The iron assay of these tailings is approximately 0.06%.

A portion of the iron float tailings is dewatered to 80% solids and the excess water returned to the conditioned ore prior to iron flotation. The dewatered tailings are conditioned with about 1 lb./ton hydrofluoric acid, 0.35 lb./ton of a high molecular weight aliphatic amine acetate, 0.5 lb./ton kerosene, and 0.2 lb./ton pine oil. The pH of the conditioned material was approximately 2.8. This hydrofluoric acid-treated iron tailing was diluted with water to about 35% solids and floated to separate the quartz from the feldspar. The feldspar-bearing froth, or concentrate, is dewatered to give a high quality product having the following assay:

*Feldspar concentrate*

| | Percent |
|---|---|
| $SiO_2$ | 67.70 |
| $Al_2O_3$ | 19.29 |
| $Fe_2O_3$ | 0.085 |
| CaO | 2.58 |
| $Na_2O$ | 4.48 |
| $K_2O$ | 4.79 | and the effluent water which contains hydrofluoric acid returned to the scrubber or scrubber discharge.

The quartz tailings from the feldspar float have the following assay:

*Quartz concentrate*

| | Percent |
|---|---|
| $SiO_2$ | 99.07 |
| $Al_2O_3$ | 0.56 |
| $Fe_2O_3$ | 0.019 |
| CaO | 0.03 |

The quartz tailings are intimately mixed with the tailing from the iron float and dewatered to give a high quality glass sand. Again, the acid-containing water from the glass sand may be returned to the scrubber effluent.

It will be evident from considering the process outlined above with reference to the drawing, that the quantity of iron-floated tailings which is subjected to the feldspar-float may be varied widely between 0% and 100% of the total iron tailing. The exact proportion of the raw feed which is subjected to the spar flotation will depend on the amount of feldspar in the original ore and the amount of feldspar desired in the finished glass sand. The feldspar by-product from my process has a stable market at a profitable price.

In the example described above, petroleum sulfonates were used as the iron flotation reagent. The petroleum sulfonates are a class of anionic flotation reagents obtained by the treatment of various petroleum lubricating oil fractions with sulfuric acid, chlorosulfonic acid, or other sulfonating agents. The petroleum sulfonates are in the main mixtures of indeterminate compositions and it is probable that they contain a considerable proportion of hydrocarbon sulfates rather than true sulfonates. However, it is customary in the industry to refer to these products as petroleum sulfonates and the general class may be further sub-divided into oil-soluble petroleum sulfonates and water-soluble petroleum sulfonates, these terms being descriptive of the solubility of the two fractions. Either oil-soluble petroleum sulfonates or water-soluble petroleum sulfonates or mixtures thereof may be used in conditioning the raw sand prior to iron flotation, but it will be recognized that the quantity of flotation reagent added will be dependent to some extent upon the nature of the petroleum sulfonate and the composition of the sand treated.

It should be particularly noted that after a portion of the iron-float tailings has been subjected to a second flotation for the purpose of separating quartz and feldspar, the excess water from both the feldspar concentrate and the quartz tailing is returned to the system, either before the scrubber or to the scrubber discharge ahead of classification. This of course, reduces the cost of my process, since it results in a considerable saving in water. More important, however, I have discovered that the addition of water containing hydrofluoric acid to the scrubber effluent actually improves the separation of iron by flotation. This was particularly surprising in view of the well-known fact that iron-bearing impurities will not float in the presence of hydrofluoric acid.

In the above example, operating with raw sand analyzing 0.15% $Fe_2O_3$ and 11.35% $Al_2O_3$ at a rate of 50 tons per hour, the mechanical splitter was adjusted to send 26.2 tons per hour to the feldspar flotation section of the circuit and 21.3 tons per hour to the glass sand mix. With this distribution of the iron float tailings, the glass sand product analyzed 7.90% $Al_2O_3$ and 0.051% $Fe_2O_3$.

I claim:

1. A method of preparing a glass sand approaching a predetermined analysis, from a raw material excessive in feldspar, deficient in quartz and containing iron-contaminating impurities, which comprises; subjecting said raw material to attrition scrubbing, and desliming; conditioning in an acid circuit with a promoter and frother; floating to produce a concentrate rich in iron and a tailing substantially iron-free; effecting the removal of the feldspar content from a portion of said tailing by conditioning said portion with hydrofluoric acid, a frother and promoter, and separating by flotation said conditioned tailing into a fraction containing the removed feldspar and a quartz fraction; and intimately mixing said quartz fraction with the remainder of said tailing to obtain said glass sand; the part of said tailing conditioned being selected so as to remove an amount of feldspar equal to the excess thereof in the original material, there being no separation of said tailing into feldspar and quartz fractions except by said conditioning operation.

2. A method according to claim 1 in which at least some of the water from the feldspar fraction is returned to the scrubber discharge.

3. A method of preparing a glass sand approaching a predetermined analysis, from an iron-contaminated raw material containing the essential constituents of said glass sand but with feldspars present in an amount in excess of that called for in said analysis, which comprises; subjecting said raw material to attrition scrubbing at about 80% solids; screening and desliming at about 20% solids; conditioning at approximately 75% solids with sulfuric acid, fuel oil, petroleum sulfonates and pine oil; floating at about 25% solids to produce a concentrate rich in iron and a tailing substantially iron-free; effecting a removal of feldspar from a portion of said tailing by conditioning said portion of said tailing at approximately 80% solids with hydrofluoric acid, a frother and promoter; separating said conditioned tailing by flotation at approximately 35% solids into a feldspar fraction and a quartz fraction; and intimately mixing said quartz fraction with the remainder of said tailing to obtain said glass sand; the said portion of said tailing conditioned being selected so as to remove an amount of feldspar equal to the excess thereof in the original material, there being no separation of said tailing into feldspar and quartz fractions except by said conditioning operations.

4. A method of preparing a glass sand analyzing less than 8.0% by weight $Al_2O_3$ and less than 0.06% by weight $Fe_2O_3$, from a raw material containing about 0.15% $Fe_2O_3$ and more than 11.0% $Al_2O_3$, which comprises; subjecting said material to attrition scrubbing at about 80% solids; screening and desliming at about 20% solids; conditioning at about 75% solids with 0.45 lb./ton sulfuric acid, 0.40 lb./ton fuel oil, 0.55 lb./ton oil-soluble petroleum sulfonate, 0.45 lb./ton water-soluble petroleum sulfonate, and 0.01 lb./ton pine oil; diluting to about 25% solids and floating to produce a concentrate rich in iron and a tailing substantially iron-free; removing about 90% of the water from a part of said tailing and recycling the water removed to the conditioner effluent before the iron float; conditioning the dewatered part of said tailing with 1.0 lb./ton hydrofluoric acid, 0.35 lb./ton of a high molecular weight alkyl amine, 0.50 lb./ton kerosene, and 0.20 lb./ton pine oil; separating the conditioned part of said tailing by flotation at approximately 35% solids into a feldspar fraction and a quartz fraction; returning said quartz fraction to that part of said tailing which was not dewatered and returning at least some of the water from the feldspar fraction to the scrubber discharge; the part of said tailing dewatered being selected so as to remove an amount of feldspar equal to the excess over 26% in the original material.

References Cited in the file of this patent

UNITED STATES PATENTS

| 2,161,010 | Breerwood et al. | June 6, 1939 |
| 2,409,665 | Cole et al. | Oct. 22, 1946 |
| 2,483,192 | Gieseke | Sept. 27, 1949 |
| 2,536,058 | Houston | Jan. 2, 1951 |

FOREIGN PATENTS

| 482,931 | Great Britain | Apr. 7, 1938 |

OTHER REFERENCES

Mine and Quarry Engineering, March 1941, pages 69–73. (Copy in Scientific Library.)